United States Patent
Seino et al.

(10) Patent No.: US 6,696,148 B1
(45) Date of Patent: Feb. 24, 2004

(54) PLASTIC WINDOW PANEL AND PROCESS FOR PRODUCING SAME

(75) Inventors: Takashi Seino, Kanagawa (JP); Kouichi Handa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/282,149

(22) Filed: Mar. 31, 1999

(30) Foreign Application Priority Data

Apr. 1, 1998 (JP) .......................................... 10-088419
Feb. 26, 1999 (JP) .......................................... 11-051015

(51) Int. Cl.$^7$ ............................... B05D 3/00; C08J 5/00
(52) U.S. Cl. ...................... 428/331; 428/323; 428/412; 428/500; 427/316; 427/372.2; 427/487; 427/489; 427/559; 264/331.17; 264/331.18; 264/331.21; 524/492; 524/493; 526/194
(58) Field of Search .............................. 428/323, 331, 428/412, 500; 427/487, 489, 559, 316, 372.2; 524/492, 493; 526/194; 264/109, 119, 331.18, 176.1, 517, 331.21, 331.17

(56) References Cited

U.S. PATENT DOCUMENTS

| | | | |
|---|---|---|---|
| 4,427,823 A | * 1/1984 | Inagaki et al. | 524/883 |
| 4,885,332 A | * 12/1989 | Bilkadi | 524/714 |
| 5,036,034 A | 7/1991 | Ewen | 502/117 |
| 5,334,677 A | * 8/1994 | Razavi et al. | 526/114 |
| 5,340,917 A | 8/1994 | Eckman et al. | 528/481 |
| 5,384,196 A | 1/1995 | Inoue et al. | 428/411 |
| 5,414,042 A | 5/1995 | Yasue et al. | 524/789 |
| 5,420,217 A | 5/1995 | Canich | 526/127 |
| 5,492,769 A | 2/1996 | Pryor et al. | 428/552 |

(List continued on next page.)

FOREIGN PATENT DOCUMENTS

| | | |
|---|---|---|
| DE | 689 03 924 T2 | 4/1993 |
| DE | 42 25 309 A1 | 2/1994 |
| JP | 5-86241 | 4/1993 |
| JP | 5-194851 | 8/1993 |
| JP | 5-306370 | 11/1993 |
| JP | 6-41346 | 2/1994 |
| JP | 6-248176 | 9/1994 |
| JP | 7-26123 | 1/1995 |
| JP | 7-47644 | 5/1995 |

OTHER PUBLICATIONS

Nobuhide Ishihara et al., "Stereospecific Polymerization Technology—Progress and Expectation", The July 1995 Issue of "Koubunshi (High Polymer)", Translation of pertinent portion on p. 429.

"Tosou–kougaka Painting Engineering" 32(4), pp. 144–151, (1997).

Primary Examiner—Monique R. Jackson
(74) Attorney, Agent, or Firm—Foley & Lardner

(57) ABSTRACT

A plastic window panel for an automotive vehicle comprises a plastic panel of a transparent noncrystalline organic high polymer. Silica particulate is dispersed in the plastic panel and has a particle size not larger than wavelengths of visible light. The plastic window panel is produced by one of a first method and a second method. The first method comprises (a) providing a first solvent in which the silica particulate having the particle size not larger than wavelengths of visible light is dispersed, and a second solvent in which the transparent noncrystalline organic high polymer is dissolved; (b) mixing the first solvent and the second solvent to obtain a resin composition; and (c) molding the resin composition under heating. The second method comprises (a) providing the silica particulate having the particle size not larger than wavelengths of visible light; (b) mixing the silica particulate into the organic high polymer which is in a process of formation of the organic high polymer, to obtain a resin composition; and (c) molding the resin composition under heating.

15 Claims, 1 Drawing Sheet

U.S. PATENT DOCUMENTS

| | | | |
|---|---|---|---|
| 5,514,466 A | * 5/1996 | Yamada et al. | 428/328 |
| 5,587,501 A | * 12/1996 | Winter et al. | 556/53 |
| 5,616,656 A | 4/1997 | Dever et al. | 525/355 |
| 5,733,659 A | * 3/1998 | Iwakiri et al. | 428/412 |
| 5,739,180 A | * 4/1998 | Taylor-Smith | 523/203 |
| 5,840,839 A | 11/1998 | Wang et al. | 530/325 |
| 5,939,182 A | * 8/1999 | Huang et al. | 428/323 |
| 6,013,749 A | * 1/2000 | Baba et al. | 526/279 |
| 6,103,852 A | 8/2000 | Shirasaka | 528/80 |
| 6,106,933 A | 8/2000 | Nagai et al. | 428/212 |

* cited by examiner

PLASTIC WINDOW PANEL AND PROCESS FOR PRODUCING SAME

BACKGROUND OF INVENTION

This invention relates to improvements in a plastic window panel and a process for producing the plastic window panel, by which the plastic window panel can be improved in strength, rigidity and surface hardness and lowered in thermal expansion coefficient without being lowered in light transmittance.

In automotive vehicles, glass (inorganic glass) panel usually occupies a large part of the outer surface of a vehicle body and therefore is an important part from the viewpoints of vehicle driving and external appearance. Glass panel is becoming high in freedom in shape upon appearance of a variety of bent glass panels, and additionally an area to be occupied with glass panel is further increasing. Accordingly, both weight-lightening and safety are required for glass panels to be used in automotive vehicles. In view of this, it has been proposed to use a panel made of organic glass in place of inorganic glass panel. However, organic glass panel is difficult to be applied for a large-size window of an automotive vehicle. In order to tackle this, it has been hitherto proposed to add glass fiber as a reinforcing material to organic glass so as to improve a rigidity of the organic glass panel; however, glass fiber usually has a diameter of about 10 microns and a length of about 200 microns and therefore prevents visible light from passing through the organic glass panel so that the organic glass panel becomes opaque upon reflection of visible light. As a result, securing a field of view is difficult, and therefore such an organic glass panel is not practical from the safety view point.

Besides, organic glass is low in surface hardness as compared inorganic glass, and therefore it tends to be readily scratched upon being scrubbed with a windshield wiper. As a result, organic glass is difficult to be applied to a window panel for an automotive vehicle. In order to tackle this, it has been proposed to accomplish a surface treatment of organic silane compound at the surface of the organic glass panel. However, even with such a surface treatment, the organic glass panel is low in surface hardness, so that the organic glass panel is insufficient in scratch resistance over a long period.

Furthermore, it has been proposed that an inorganic glass is laminated on the surface of the organic glass panel in order to ensure high rigidity and surface hardness. However, such a laminated panel may cause separation between the inorganic glass and the organic glass under the difference in thermal expansion between them. This makes it difficult to ensure the field of view, and therefore such a laminated panel is not practical.

Recently, sputtering silica on a plastic sheet has been carried out in order to harden the surface of and improve the rigidity of the plastic sheet used as a plastic memory disk for an electronic component. However, in this technique, silica atoms are adhered onto the surface of the plastic sheet or base under vacuum, and therefor the technique is not suitable for a large-size part so as to be low in production efficiency.

In addition to the above, a variety of proposals have been made on improvements in and around organic glass as disclosed in Japanese Patent 7-47644, Japanese Patent Provisional Publication No. 5-86241, Japanese Patent Provisional Publication No. 5-194851, Japanese Patent Provisional Publication 5-306370, Japanese Patent Provisional Publication No. 6-41346, Japanese Patent Provisional Publication No. 6-248176, Japanese Patent Provisional Publication No. 7-26123, and an article (pages 144 to 151) and another article (pages 137 to 143) in Japanese technical journal "Tosou-kougaku (Painting Engineering)", Vol. 32, No. 4 (1997).

However, any of the above earlier technologies for improving the characteristics of organic glass has not been able to provide a plastic window panel having the characteristics suitable for window panels (such as windshield and the like) of an automotive vehicle.

SUMMARY OF THE INVENTION

It is an object of the present invention to provide an improved plastic window panel which can overcome drawbacks encountered in plastic panels produced by earlier technologies.

Another object of the present invention is to provide an improved plastic window panel which is high in strength, rigidity, surface hardness and low in thermal expansion coefficient as compared with a panel of a single transparent resin, without lowering a light transmittance of a transparent high molecular weight polymer (hereinafter "high polymer") serving as a matrix.

A further object of the present invention is to provide an improved plastic window panel which can be reduced in thickness and therefore become light in weight as compared with a conventional organic glass panel, because the plastic window panel is improved in strength and rigidity.

A still further object of the present invention is to provide an improved plastic window panel which can be high in surface hardness so as to be prevented from being scratched at its surface even upon a long time use as compared with a conventional organic glass panel, because a conventional hard coating formed of organic silane compound has been insufficient in surface hardness.

A still further object of the present invention is to provide an improved plastic window panel which can be low in thermal expansion coefficient so as to be prevented from being unevenly deformed even at a high temperature condition in summer, because the plastic window panel is low in thermal expansion coefficient.

A first aspect of the present invention resides in a plastic window panel which comprises a plastic panel of a transparent noncrystalline organic high polymer; and silica particulate dispersed in the plastic panel and having a particle size not larger than wavelengths of visible light. The plastic window panel is produced by one of a first method and a second method. The first method comprises (a) providing a first solvent in which the silica particulate having the particle size not larger than wavelengths of visible light is dispersed, and a second solvent in which the transparent noncrystalline organic high polymer is dissolved; (b) mixing the first solvent and the second solvent to obtain a resin composition; and (c) molding the resin composition under heating. The second method comprises (a) providing the silica particulate having the particle size not larger than wavelengths of visible light; (b) mixing the silica particulate into the organic high polymer which is in a process of formation of the organic high polymer, to obtain a resin composition; and (c) molding the resin composition under heating.

A second aspect of the present invention resides in a plastic window panel which comprises a transparent plastic panel; and a surface layer formed on a surface of the plastic panel and formed of a transparent noncrystalline organic high polymer and containing silica particulate having a particle size not larger than wavelengths of visible light, the surface layer having a gradation in a silica particulate concentration in which the concentration of the silica particulate gradually lowers toward a center in thickness of the plastic window panel, the surface layer including a surface-most layer having a silica particulate concentration ranging from 50 to 92% by weight. The plastic window panel is produced by one of a first method and a second method. The first method comprises: (a) providing a first solvent in which the silica particulate having the particle size not larger than wavelengths of visible light is dispersed, and a second solvent in which the transparent noncrystalline organic high polymer is dissolved; (b) mixing the first solvent and the second solvent to obtain a resin composition; (c) dissolving the resin composition in a solvent to form a resinous solution; (d) applying the resinous solution onto the plastic panel; and (e) drying he resinous solution on the plastic panel at a temperature ranging from 18 to 25° C. and at a drying rate ranging from 16 to 32 kg/M$^2$ so as to form the surface layer. The second method comprises: (a) providing the silica particulate having the particle size not larger than wavelengths of visible light; (b) mixing the silica particulate into the organic high polymer which is in a process of formation of the organic high polymer, to obtain a resin composition; (c) dissolving the resin composition in a solvent to form a resinous solution; (d) applying the resinous solution onto the plastic panel; and (e) drying the resinous solution on the plastic panel at a temperature ranging from 18 to 25° C. and at a drying rate ranging from 16 to 32 kg/m$^2$·hr, so as to form the surface layer.

A third aspect of the present invention resides in a process for producing a plastic window panel, which process is one of a first process and a second process. The first process comprising: (a) providing a first solvent in which silica particulate having a particle size not larger than wavelengths of visible light is dispersed, and a second solvent in which a transparent noncrystalline organic high polymer is dissolved; (b) mixing the first solvent and the second solvent to obtain a resin composition; and (c) molding the resin composition under heating. The second process comprises (a) providing silica particulate having a particle size not larger than wavelengths of visible light; (b) mixing the silica particulate into a transparent noncrystalline organic high polymer which is in a process of formation of the organic high polymer, to obtain a resin composition; and (c) molding the resin composition under heating.

A fourth aspect of the present invention resides in a process for producing a plastic window panel including a transparent plastic panel, and a surface layer formed on a surface of the plastic panel and formed of a transparent noncrystalline organic high polymer and containing silica particulate having a particle size not larger than wavelengths of visible light, the surface layer having a gradation in a silica particulate concentration in which the concentration of the silica particulate gradually lowers toward a center in thickness of the plastic window panel, the surface layer including a surface-most layer having a silica particulate concentration ranging from 50 to 92% by weight. The producing process is one of a first process and a second process. The first process comprises: (a) providing a first solvent in which the silica particulate having the particle size not larger than wavelengths of visible light is dispersed, and a second solvent in which the transparent noncrystalline organic high polymer is dissolved; (b) mixing the first solvent and the second solvent to obtain a resin composition having a ratio in % by weight between the silica particulate and the organic high polymer being 41/59 to 79/21; (c) dissolving the resin composition in a solvent to form a resinous solution; (d) applying the resinous solution onto the plastic panel; and (e) drying the resinous solution on the plastic panel at a temperature ranging from 18 to 25° C. and at a drying rate ranging from 16 to 32 kg/m$^2$ so as to form the surface layer. The second process comprises (a) providing the silica particulate having the particle size not larger than wavelengths of visible light; (b) mixing the silica particulate into the organic high polymer which is in a process of formation of the organic high polymer, to obtain a resin composition; (c) dissolving the resin composition in a solvent to form a resinous solution; (d) applying the resinous solution onto the transparent plastic panel; and (e) drying the resinous solution on the transparent plastic panel at a temperature ranging from 18 to 25° C. and at a drying rate ranging from 16 to 32 kg/m$^2$, so as to form the surface layer.

DETAILED DESCRIPTION OF THE EMBODIMENT

Figure 1:
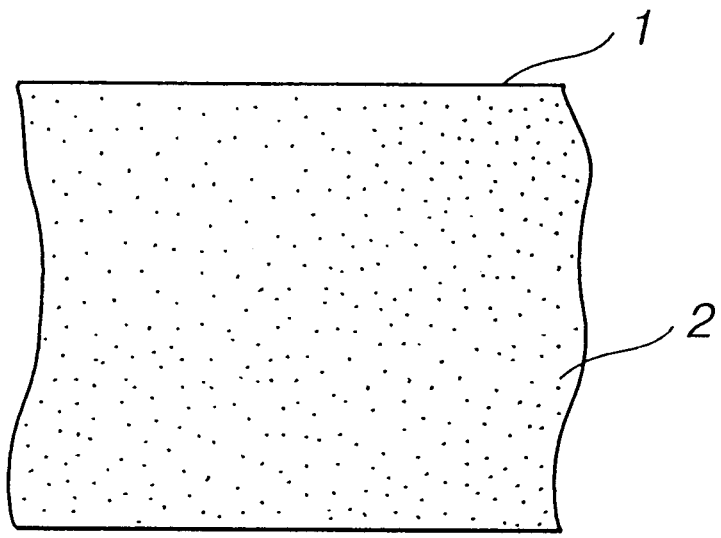
FIG. 1 is a fragmentary sectional view of an embodiment of a plastic window panel according to the present invention.

According to the present invention, an embodiment of a plastic window panel according to the present invention comprises a plastic panel 1 of a transparent noncrystalline (amorphous) organic high polymer; and silica particulate 2 dispersed in the plastic panel and having a particle size not larger than wavelengths of visible light, as shown in FIG. 1. The plastic window panel is produced by one of a first method and a second method. The first method comprises (a) providing a first solvent in which the silica particulate having the particle size not larger than wavelengths of visible light is dispersed, and a second solvent in which the transparent noncrystalline organic high polymer is dissolved; (b) mixing the first solvent and the second solvent to obtain a resin composition; and (c) molding the resin composition under heating. The second method comprises (a) providing the silica particulate having the particle size not larger than wavelengths of visible light; (b) mixing the silica particulate into the organic high polymer which is in a process of formation of the organic high polymer, to obtain a resin composition; and (c) molding the resin composition under heating. The plastic window panel is used, for example, for a window of an automotive vehicle and in place of a conventional windshield glass of an automotive vehicle. It will be understood that the plastic window panel may be used for other windows through which visible light passes.

In general, in order to increase the strength and rigidity of organic glass or transparent noncrystalline (amorphous) glass-like plastic, it has been proposed to use high strength and rigidity polymer as the components of the plastic, taking account of molecular structure of an organic high polymer constituting the plastic. However, such a high strength and rigidity molecular is generally high in crystallinity, so that the transparency of the plastic generally lowers as the crystallinity of the plastic increases. In view of this, according to the present invention, the silica particulate having a diameter not larger than 380 nm or the smallest value of wavelengths of visible light is mixed and dispersed in a transparent noncrystalline (amorphous) organic high polymer thereby to improve the strength and rigidity of a transparent plastic while ensuring the transparency of the transparent plastic.

In general, when silica particulate is mixed with the plastic or organic high polymer in a molten state and kneaded, aggregation of silica particulate tends to occur so that the plastic becomes opaque. In view of this, in order to prevent the plastic from becoming opaque, silica particulate is dispersed in a solvent while the transparent noncrystalline organic high polymer is dissolved in another solvent. The two solvents are mixed with each other, and then silica particulate and the organic high polymer are sedimented by using a solvent for causing solidification of them, thereby obtaining the resin composition containing silica particulate and the organic high polymer. This is referred to as a "first production method" for the resin composition. In this production method, when the amount of silica particular to be mixed increases over a certain level, aggregation of silica particulate tends to readily occur. In such a case, the following production method may be used: Silica particulate dispersed in a solvent is added into the transparent noncrystalline organic high polymer in a process or course of formation of the organic high polymer, and then a reaction system of the high polymer is mixed. -Subsequently, the high polymer and silica particulate are sedimented with a solvent for solidification of them thereby to obtain the resin composition containing silica particulate and the organic high polymer. This production method is referred to as a "second production method" for the resin composition. The organic high polymer is formed under polymerization reaction which is accomplished by polymerization methods such as suspension polymerization, solution polymerization, emulsion polymerization, bulk polymerization and the like.

Silica particulate constituting part of the plastic window panel according to the present invention has a particle size (diameter) not larger than the minimum value (380 nm) of the wavelengths of visible light. Such a particle size of silica particulate is selected in order to ensure transparency of the plastic window panel. The particle size of silica particulate is preferably within a range of from 5 to 20 nm, in which the plastic window panel is particularly high in total light transmittance and Rockwell hardness. Silica particulate constituting part of the plastic window panel according to the present invention is available on the market as shown in Table 1. It will be understood that each silica particulate may be provided at its surface with hydroxyl group or methyl group as shown in Table 1, in which hydroxyl group or methyl group is chemically bonded to silicon atom of silica.

By further decreasing the particle size of silica particulate, it is assumed that silica particulate is positioned in a space between adjacent molecules of the high polymer so that dispersion of silica particulate is further improved. This can largely improve the transparency, the surface hardness, the flexural strength and the flexural elastic modulus of the plastic window panel and lower the linear expansion coefficient of the plastic window panel. In this regard, the particle size of silica particulate is more preferably within a range of from 5 to 10 nm.

The shape of silica particulate may be spherical, plate-like, needle-like and the like. In case that the shape is not spherical, the particle size (diameter) of silica particulate may be measured by averaging a plurality of dimensions corresponding to the diameters.

In the above first production method, the transparent noncrystalline organic high polymer is an oligomer and/or a polymer of acrylic resin, polycarbonate resin, styrene-containing resin (such as a polystyrene), polyolefin resin and/or the like. The transparent organic high polymer is preferably a polyolefin, such as syndiotactic polypropylene resin which has been synthesized in the presence of a metallocene catalyst or polypropylene resin which is mixed with syndiotactic polypropylene resin. By using syndiotactic polypropylene resin which is higher in transparency than usual polypropylene resin and by using silica particles having further small particle size so that the silica particulate is positioned in the space between adjacent molecules of the high polymer, the resultant plastic window panel can be largely improved in transparency, surface hardness, flexural elastic modulus and lowered in linear expansion coefficient.

It is preferable that one or both of opposite surfaces of the plastic window panel is coated with a hard coating layer made of organic silane compound so as to harden the surface of the plastic window panel. This further improves the surface hardness of the plastic window panel as compared with the plastic window panel which has been hardened only under the action of silica particulate. Additionally, it is preferable that the hard coating layer contains ultraviolet ray absorbing agent, thereby improving weatherability of syndiotactic polypropylene resin.

In the second production method, the transparent noncrystalline organic high polymer is the same as that in the first production method. Additionally, in the second production method, monomer for forming the transparent noncrystalline organic high polymer is polymerized by the above-mentioned polymerization methods. The monomer is, for example, methyl methacrylate in case of forming acrylic resin. In the second production method, silica particulate of the present invention is added into the reaction system of the monomer in the process or course of the polymerization of the monomer. The transparent noncrystalline organic high polymer is oligomer and/or polymer of acrylic resin, polycarbonate resin, styrene-containing resin (such as polystyrene), polyolefin resin and/or the like.

In the first production method, two kinds of solvents are used, in which silica particulate is dispersed in one solvent while the transparent crystalline organic high polymer is dissolved in another solvent. The two kinds of solvents may be the same or different from each other, and therefore each solvent may be any kind of solvent as far as the former solvent is to be a solvent in which silica particulate can be dispersed while the latter solvent is to be a solvent in which the organic high polymer can be dissolved.

In the second production method, silica particulate is dispersed in one solvent. Monomer (for forming the transparent crystalline organic high polymer) and the polymer may be dissolved in another solvent. The two kinds of solvents may be the same or different from each other, and therefore each solvent may be any kind of solvent as far as the former solvent is to be a solvent in which silica particulate can be dispersed while the latter solvent is to be a solvent in which the monomer and the polymer can be dissolved.

In the resin composition in the first and second production methods, the surface of each silica particulate is covered with the organic high polymer, and therefore silica particulate is well dispersed in the plastic window panel, so that the plastic window panel is high in transparency.

The plastic window panel according to the present invention is fabricated as a molded product by molding under heating the resin composition obtained by the first or second production method, into a desired shape having a variety of dimensions and curved surfaces, for example, upon using a melt-extrusion molding, an injection molding, a blow molding and the like. The molded product exhibits a thermal expansion coefficient which is sharply lowered as compared with that of the single transparent noncrystalline high polymer.

Figure 2:
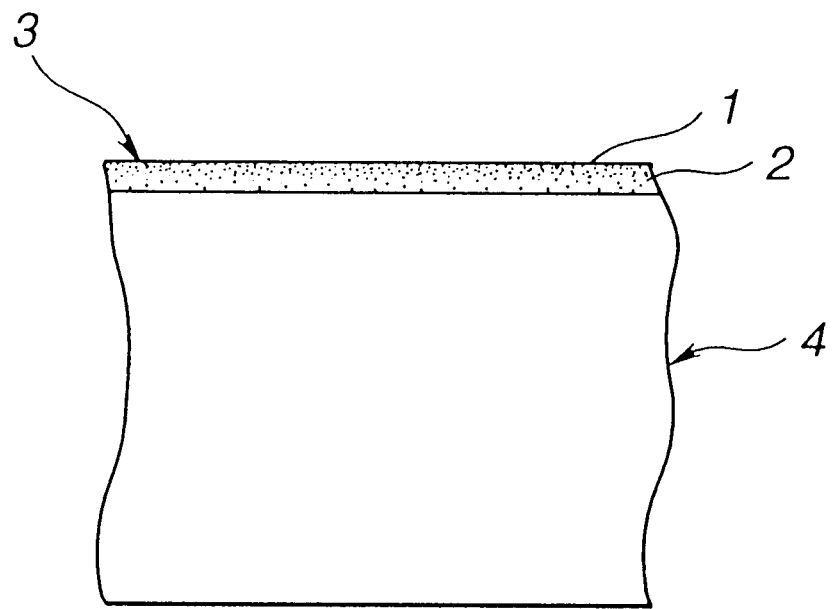
FIG. 2 is a fragmentary sectional view of another embodiment of the plastic window panel according to the present invention.

As shown in FIG. 2, another embodiment of the plastic window panel according to the present invention comprises a transparent plastic panel 4; and a surface (coating) layer 3 formed on a surface of the plastic panel and formed of a transparent noncrystalline (amorphous) organic high polymer 1 and containing silica particulate 2 having a particle size not larger than wavelengths of visible light, the surface layer having a gradation in a silica particulate concentration in which the concentration of the silica particulate gradually lowers toward a center in thickness of the plastic window panel, the surface layer including a surface-most layer having a silica particulate concentration ranging from 50 to 92% by weight. The plastic window panel is produced by one of a first method and a second method. The first method comprises: (a) providing a first solvent in which the silica particulate having the particle size not larger than wavelengths of visible light is dispersed, and a second solvent in which the transparent noncrystalline organic high polymer is dissolved; (b) mixing the first solvent and the second solvent to obtain a resin composition; (c) dissolving the resin composition in a solvent to form a resinous solution; (d) applying the resinous solution onto the plastic panel; and (e) drying the resinous solution on the plastic panel at a temperature ranging from 18 to 25° C. and at a drying rate ranging from 16 to 32 kg/m² so as to form the surface layer. The second method comprises: (a) providing the silica particulate having the particle size not larger than wavelengths of visible light; (b) mixing the silica particulate into the organic high polymer which is in a process of formation of the organic high polymer, to obtain a resin composition; (c) dissolving the resin composition in a solvent to form a resinous solution; (d) applying the resinous solution onto the plastic panel; and (e) drying the resinous solution on the plastic panel at a temperature ranging from 18 to 25° C. and at a drying rate ranging from 16 to 32 kg/m², so as to form the surface layer.

Here, the surface-most layer means a layer defined between the surface of the surface layer 3 and an imaginary plane (not shown) which is substantially parallel with and separate from the surface of the surface layer 3 in a direction of thickness of the surface layer by a distance corresponding to 1% of the thickness of the surface layer 3. The distance may correspond to 5% of the thickness of the surface layer 3. The plastic window panel is used, for example, for a window of an automotive vehicle and in place of a conventional windshield glass of an automotive vehicle. It will be understood that the plastic window panel may be used for other windows through which visible light passes.

In order to obtain the plastic window panel whose surface layer is particularly high in hardness, the surface layer of the plastic window panel is formed of the resin composition produced by the first or second production method. The surface layer includes the surface-most layer having a high concentration of silica particulate ranging from 50 to 92% by weight, and has a silica particulate concentration gradation in which the concentration of silica particulate lowers toward the center in a thickness direction of the plastic window panel. If the silica particular concentration of the surface-most layer exceeds 92% by weight, the content of the polymer serving as a binder is too small and therefore the surface-most layer will be brittle. If the silica particulate concentration is lower than 50% by weight, the hardness of the surface-most layer is insufficient. The silica particulate concentration of the surface-most layer is preferably within a range of from 70 to 80% by weight. A method of forming the surface-most layer will be discussed hereinafter.

First, the resin composition obtained by the first or second production method is dissolved in a solvent to prepare the resinous solution. The resinous solution is applied on the surface of the transparent plastic panel (for example, a panel of acrylic resin). Subsequently, the thus applied resinous solution is dried at an atmospheric temperature ranging from 18 to 25° C. and at a drying rate ranging from 16 to 32 kg/m2·hr. Under this operation, the concentration of silica particulate in the surface-most layer of the plastic window panel falls within a range of 50 to 92% by weight. In this production process, it is preferable to control a ratio (in weight) of silica particulate and the organic high polymer (silica particulate/the organic high polymer) in the resin composition obtained by the first or second production method, within a range of from 41/59 to 79/21. This causes the concentration of silica particulate in the surface-most layer of the plastic window panel to fall within the range of from 50 to 92% by weight.

In order to cause the ratio of silica particulate to the organic high polymer in the resin composition obtained by the first or second production method to fall within the range of from 41/59 to 79/21, it is sufficient that a ratio of silica particulate and the organic high polymer (the silica particulate/the organic high polymer) is controlled within a range of from 41/59 to 79/21 in the first production method, and a ratio of silica particulate to be added during polymerization of the organic high polymer and the monomer to be polymerized is within a range of from 41/59 to 79/21 in the second production method.

In order to obtain the plastic window panel formed with a particularly highly rigid surface layer and having a high flexural strength and a high flexural elastic modulus, the plastic window panel of the present invention is produced by forming such a surface layer as to include the surface-most layer having the silica particulate concentration ranging from 50 to 92% by weight, and as to have the silica particulate concentration gradation in which the concentration of silica particulate gradually lowers toward the center in thickness direction of the plastic window panel, as discussed above. This plastic window panel is produced by the following method: First, the resin composition having the ratio of silica particulate and the organic high polymer within the range of from 41/59 to 79/21 is dissolved to prepare the resinous solution. The thus prepared resinous solution is applied onto the transparent plastic panel and dried at the atmospheric temperature ranging from 18 to 25° C. and at the drying rate ranging from 16 to 32 kg/m²·hr. In this case, if the temperature during drying is lower than 18° C., the vapor pressure of the solvent lowers to retard vaporization of the solvent, and therefore a time is required until silica particulate moves to the surface part of the surface-most layer. As a result, the viscosity of the resinous solution increases so as to cause solidification of the resinous solution before a sufficient concentration gradation of silica particulate has not been formed. If the temperature during drying exceeds 25° C., drying of the surface of the surface layer begins first. As a result, gas bubble is generated when the solvent vaporizes under the surface of a resinous film (the surface layer). Additionally, the surface of the surface layer has been hardened before silica particulate moves to the surface-most layer of the surface layer, and therefore it is impossible to form the silica particulate concentration gradation in which the silica particulate concentration is high in the surface-most layer.

In case that the drying rate is higher over 32 kg/m$^2$·hr, only the surface-most layer of the surface layer is solidified so that the surface-most layer cannot have a high silica particulate concentration. If the drying rate is lower than 16 kg/m$^2$·hr, a considerable time is required to allow silica particulate to move to the surface-most layer under convection of silica particulate upon vaporization of the solvent, so that only the surface-most layer becomes high in concentration of silica particulate thereby providing no silica particulate concentration gradation.

The resinous solution is applied onto the surface of the transparent plastic panel, for example, by a variety of methods. The methods include a dipping method in which the transparent plastic panel is dipped in the resinous solution and then drawn up at a constant speed to coat the transparent plastic panel with the resinous solution; a flow coating method in which the resinous solution is coated on the transparent plastic panel under flow coating by using a nozzle; a casting method in which casting of the resinous solution is made on the transparent plastic panel; and a spin coating method in which the resinous solution is coated on the transparent plastic panel under spin coating. It will be understood that one of such a variety of the methods is selected in accordance with a required thickness of the coated film or surface layer formed on the surface of the transparent plastic panel.

As discussed above, the transparent plastic panel can be effectively improved in rigidity and surface hardness and lowered in thermal expansion coefficient without lowering a total light transmittance of the transparent plastic panel, by applying the resinous solution on the surface of the transparent plastic panel. The resinous solution has been prepared by dissolving the resin composition in the organic solvent. The resin composition has been formed by mixing silica particulate (for example, spherical silica particulate) dispersed in the solvent and having the diameter ranging from 5 to 20 nm (not larger than the wavelengths of visible light) and the transparent noncrystalline organic high polymer dissolved in the solvent, or by mixing the above-mentioned silica particulate in the noncrystalline organic high polymer which is in the course of polymerization. The resinous solution applied on the transparent plastic panel is dried at the predetermined atmospheric temperature and at the predetermined drying rate, thereby forming the silica particulate concentration gradation in the surface layer of the plastic window panel.

The examples described below are presented for illustrative purposes only, and are not intended to limit the scope of the invention of this application, which is as defined in the claims below.

EXAMPLE 1

Benzoyl peroxide in an amount of 0.5 part by weight was mixed in 100 parts by weight of methyl methacrylate to form a reaction mixture. Polymerization of the reaction mixture was made upon heating the reaction mixture at 90° C. while methyl ethyl ketone (solvent) in which silica particulate (having a particle size ranging from 10 to 20 nm) had been dispersed was slowly added dropwise into the reaction mixture. After about 1 hour, ethanol as a solvent for solidification was added to the reaction mixture so as to sediment silica particulate and acrylic resin. As a result, a resin composition was obtained to have a ratio (in wt %) between silica particulate and acrylic resin (polymethyl methacrylate resin) being 40/60.

The thus obtained resin composition was dried and formed into a specimen for a plastic window panel by a melting-extrusion molding. The thus formed specimen was subjected to measurements for a total light transmittance, a Rockwell hardness, a flexural strength, a flexural elastic modulus, a linear expansion coefficient, and to photographing the dispersion state of the silica particulate by using a transmission electron microscope. The results of the measurements are shown in Table 1. The results in Table 1 exhibit that the specimen was excellent in dispersion state of silica particulate and good in transparency. This is supposed to depend upon the fact that, in the resin composition constituting the specimen, the surface of each silica particulate was covered with the polymer of polymethyl methacrylate.

It has been confirmed that the specimen was high in transparency and improved in the hardness of its surface, the flexural strength, the flexural elastic modulus, and lowered in the linear expansion coefficient, as compared with single acrylic resin.

EXAMPLE 2

Methyl ethyl ketone (solvent) in which silica particulate (having a particle size ranging from 10 to 20 nm) had been dispersed to have a solid content of 66.7 parts by weight was added dropwise into a polymethyl methacrylate solution which had been prepared by dissolving polymethyl methacrylate in methyl ethyl ketone to have a solid content of 100 parts by weight, thus to form a mixture solution. The mixture solution was stirred and mixed with each other. Then, ethanol as a solvent for solidification was added to the mixture solution so as to sediment silica particulate and polymethyl methacrylate resin. As a result, a resin composition was obtained to have a ratio (in wt %) between silica particulate and acrylic resin being 40/60.

The thus obtained resin composition was dried and formed into a specimen for a plastic window panel by a melting-extrusion molding. The thus formed specimen was subjected to measurements for a total light transmittance, a Rockwell hardness, a flexural strength, a flexural elastic modulus, a linear expansion coefficient, and to photographing the dispersion state of silica particulate by using a transmission electron microscope. The results of the measurements are shown in Table 1. The results in Table 1 exhibits that the specimen was excellent in dispersion state of silica particulate and good in transparency. This is supposed to depend upon the fact that, in the resin composition constituting the specimen, the surface of each silica particulate was covered with polymethyl methacrylate polymer.

It has been confirmed that the specimen was high in transparency and improved in the hardness of its surface, the flexural strength, the flexural elastic modulus, and lowered in the linear expansion coefficient, as compared with single acrylic resin.

EXAMPLE 3

Methyl ethyl ketone (solvent) in which silica particulate (having a particle size ranging from 100 to 200 nm) has been dispersed in solid content of 66.7 parts by weight was added dropwise into a polymethyl methacrylate solution which had been prepared by dissolving polymethyl methacrylate in solid content of 100 parts by weight, so as to form a mixture solution. The mixture solution was stirred and mixed with each other. Then, ethanol as a solvent for solidification was added to the mixture solution so as to sediment silica particulate and polymethyl methacrylate resin. As a result, a resin composition was obtained to have a ratio (in wt %) between silica particulate and acrylic resin being 40/60.

The thus obtained resin composition was dried and formed into a specimen for a plastic window panel by a melting-extrusion molding. The thus formed specimen was subjected to measurements for a total light transmittance, a Rockwell hardness, a flexural strength, a flexural elastic modulus, a linear expansion coefficient, and to photographing the dispersion state of silica particulate by using a transmission electron microscope. The results of the measurements are shown in Table 1. The results in Table 1 exhibits that the specimen was good in dispersion state of silica particulate and good in transparency. This is supposed to depend upon the fact that, in the resin composition constituting the specimen, the surface of each silica particulate was covered with the polymer of polymethyl methacrylate.

It has been confirmed that the specimen was high in transparency and improved in the hardness of its surface, the flexural strength, the flexural elastic modulus, and lowered in the linear expansion coefficient, as compared with single acrylic resin.

EXAMPLE 4

A resin composition having a ratio (in wt %) between silica particulate and polymethyl methacrylate resin being 50/50 was produced by a production process similar to that in Example 1. The resin composition was pulverized by a pulverizer so as to obtain powder of the resin composition. 100 parts by weight of the powder was mixed and kneaded with 10 parts by weight of molten polymethyl methacrylate resin by using a biaxial kneading and extruding machine thereby to obtain transparent pellets having a ratio (in wt %) between silica particulate and polymethyl methacrylate resin being 45/55. The pellets were formed into a specimen for a plastic window panel, under an injection molding.

The thus formed specimen was subjected to measurements for a total light transmittance, a Rockwell hardness, a flexural strength, a flexural elastic modulus, a linear expansion coefficient, and to observation by a transmission electron microscope so as to observe a dispersion state of silica particulate. The results of the measurements are shown in Table 1. It has been confirmed that the specimen was high in transparency and improved in the hardness of its surface, the flexural strength, the flexural elastic modulus, and lowered in the linear expansion coefficient, as compared with single acrylic resin.

In a similar production process to that for the above-mentioned pellets, various kinds of pellets were produced in which the contents of silica particulate were different in the respective kinds of pellets. Each kind of pellets was formed into a flat panel under an extrusion molding and then subjected to a blow molding to form a bottle (molded product). It was confirmed that the molded products formed of the various kinds of pellets were good in performance.

According to the production process of Example 4, the resin composition (having the wt % ratio between silica particulate and polymethyl methacrylate resin being 50/50) in which the surface of each silica particulate was covered with polymethyl methacrylate polymer had been previously produced by the production process similar to that in Example 1. Therefore, the powder obtained by pulverizing the resin composition had a structure in which the surface of each silica particulate was covered with polymethyl methacrylate resin, and therefore dispersion of silica particulate was sufficient in the molded products which were obtained by kneading the powder with polymethyl methacrylate resin upon using the biaxial kneading machine and by molding the kneaded power and the resin. Accordingly, the molded products were good in transparency.

EXAMPLE 5

A resin composition having a ratio (in wt %) between silica particulate and polymethyl methacrylate resin being 60/40 was produced by a production process similar to that in Example 1. The resin composition was dissolved in methyl ethyl ketone thereby preparing a resinous solution. Then, an acrylic resin panel was dipped in the resinous solution in a tank, in such a manner that the acrylic resin panel was located vertical. The acrylic resin panel was then drawn up at a constant speed thus accomplishing coating of the resinous solution under a dipping. The thus coated acrylic resin panel was dried at 20° C. at a drying rate ranging from 25 to 27 kg/m$^2$·hr so as to obtain a specimen for a plastic window panel, which was coated at its opposite surfaces with coating layers.

The thus formed specimen was subjected to measurements for a total light transmittance, a Rockwell hardness, a flexural strength, a flexural elastic modulus, a linear expansion coefficient, and to photographing the dispersion state of silica particulate by using a transmission electron microscope. The results of the measurements are shown in Table 2. It has been confirmed that the specimen was high in transparency and improved in the hardness of its surface, the flexural strength, the flexural elastic modulus, and lowered in the linear expansion coefficient, as compared with single acrylic resin. As a result of photographing the dispersion state of silica particulate in the specimen by using the transparent electron microscope, it was found that the coating layers had a concentration gradation of silica particulate in which the concentration of silica particulate gradually lowered toward the center in the thickness direction of the specimen. Thus, the surface-most layers of the coating layers (surface layers) were high in concentration of silica particulate, in which the silica particulate concentration obtained under image processing for the surface-most layer was within a range of from 70 to 80% by weight.

It has been confirmed that the specimen was high in transparency and improved in the hardness of its surface, the flexural strength, the flexural elastic modulus, and lowered in the linear expansion coefficient, as compared with single acrylic resin. Additionally, it has been confirmed that the specimen was higher in the surface hardness than an acrylic resin panel which was coated at its surface with an organic silane compound.

EXAMPLE 6

A resin composition having a ratio (in wt %) between silica particulate and polymethyl methacrylate resin being 60/40 was produced by a production process similar to that in Example 1. The resin composition was dissolved in methyl ethyl ketone thereby preparing a resinous solution. Then, the resinous solution was coated on an acrylic resin panel at a constant speed by using a bar coater thereby accomplishing coating of the resinous solution under a casting. The thus coated resinous solution on the acrylic resin panel was dried at 20° C. at a drying rate ranging from 16 to 18 kg/m$^2$·hr so as to obtain a specimen for a plastic window panel, which was coated at its one surface with a coating layer.

The thus formed specimen was subjected to measurements for a total light transmittance, a Rockwell hardness, a flexural strength, a flexural elastic modulus, a linear expansion coefficient, and to photographing the dispersion state of silica particulate by using a transmission electron microscope. The results of the measurements are shown in Table 2. It has been confirmed that the specimen was high in transparency and improved in the hardness of its surface, the flexural strength, the flexural elastic modulus, and lowered in the linear expansion coefficient, as compared with single acrylic resin. As a result of photographing the dispersion state of silica particulate in the specimen by using the transparent electron microscope, it was found that the coating layers had a concentration gradation of silica particulate in which the concentration of silica particulate gradually lowered toward the center in thickness direction. The surface-most layers of the coating layers were high in concentration of silica particulate, in which the silica particulate concentration obtained under image processing for the surface-most layer was within a range of from 70 to 80% by weight.

It has been confirmed that the specimen was high in transparency and improved in the hardness of its surface, the flexural strength, the flexural elastic modulus, and lowered in the linear expansion coefficient, as compared with single acrylic resin. Additionally, it has been confirmed that the specimen was higher in the surface hardness than an acrylic resin panel which was coated at it surface with an organic silane compound.

EXAMPLE 7

A resin composition having a ratio (in wt %) between silica particulate and polymethyl methacrylate resin being 60/40 was produced by a production process similar to that in Example 1. The resin composition was dissolved in methyl ethyl ketone thereby preparing a resinous solution. Then, the resinous solution was coated on a vertically located acrylic resin panel upon moving a nozzle (for ejecting the resinous solution) vertically downwardly at a constant speed thereby accomplishing coating of the resinous solution under a flow coating. The thus coated resinous solution on the acrylic resin panel was dried at 20° C. at a drying rate ranging from 20 to 22 kg/m$^2$·hr so as to obtain a specimen for a plastic window panel, which was coated at its one surface with a coating layer.

The thus formed specimen was subjected to measurements for a total light transmittance, a Rockwell hardness, a flexural strength, a flexural elastic modulus, a linear expansion coefficient, and to photographing the dispersion state of silica particulate by using a transmission electron microscope. The results of the measurements are shown in Table 2. It has been confirmed that the specimen was high in transparency and improved in the hardness of its surface, the flexural strength, the flexural elastic modulus, and lowered in the linear expansion coefficient, as compared with single acrylic resin. As a result of photographing the dispersion state of silica particulate in the specimen by using the transparent electron microscope, it was found that the coating layers had a concentration gradation of silica particulate in which the concentration of silica particulate gradually lowered toward the center in thickness direction. Thus, the surface-most layers of the coating layers were high in concentration of silica particulate, in which the silica particulate concentration obtained under image processing for the surface-most layer was within a range of from 70 to 80% by weight.

It has been confirmed that the specimen was high in transparency and improved in the hardness of its surface, the flexural strength, the flexural elastic modulus, and lowered in the linear expansion coefficient, as compared with single acrylic resin. Additionally, it has been confirmed that the specimen is higher in the surface hardness than an acrylic resin panel which was coated at its surface with an organic silane compound.

EXAMPLE 8

A resin composition having a ratio (in wt %) between silica particulate and polymethyl methacrylate resin being 60/40 was produced by a production process similar to that in Example 1. The resin composition was dissolved in methyl ethyl ketone thereby preparing a resinous solution. Then, the resinous solution was coated on an acrylic resin panel thereby accomplishing coating of the resinous solution under a spin coating. The thus coated resinous solution on the acrylic resin panel was dried at 20° C. at a drying rate ranging from 30 to 32 kg/m$^2$·hr so as to obtain a specimen for a plastic window panel, which was coated at its one surface with a coating layer.

The thus formed specimen was subjected to measurements for a total light transmittance, a Rockwell hardness, a flexural strength, a flexural elastic modulus, a linear expansion coefficient, and to photographing the dispersion state of silica particulate by using a transmission electron microscope. The results of the measurements are shown in Table 2. It has been confirmed that the specimen was high in transparency and improved in the hardness of its surface, the flexural strength, the flexural elastic modulus, and lowered in the linear expansion coefficient, as compared with single acrylic resin. As a result of photographing the dispersion state of silica particulate in the specimen by using the transparent electron microscope, it was found that the coating layers had a concentration gradation of silica particulate in which the concentration of silica particulate gradually lowered toward the center in thickness direction. Thus, the surface-most layers of the coating layers were high in concentration of silica particulate, in which the silica particulate concentration obtained under image processing for the surface-most layer was within a range of from 70 to 80% by weight.

It has been confirmed that the specimen was high in transparency and improved in the hardness of its surface, the flexural strength, the flexural elastic modulus, and lowered in the linear expansion coefficient, as compared with single acrylic resin. Additionally, it has been confirmed that the specimen was higher in the surface hardness than an acrylic resin panel which was coated at its surface with an organic silane compound.

EXAMPLE 9

Polycarbonate resin (produced by GE Plastics Japan Ltd. and having the trade name of Lexan 131) was dissolved in methylene chloride (solvent) adjusting the concentration of a solution of polycarbonate resin at 14% by weight, thus preparing a resin solution. Silica particulate (produced by Nippon Aerosil Co., Ltd. and having the trade mane of RX200) was added to the resinous solution, in such an amount of 40% by weight relative to the solid content of the polycarbonate resin in the resinous solution. Then, the resinous solution was stirred and well mixed in which defoaming agent, coupling agent and the like were suitably added to the resinous solution, thereby obtaining a transparent resinous solution containing silica particulate and the resin. This resinous solution was dried and molded under heating to form a specimen for a plastic window panel.

The thus formed specimen was subjected to measurements for a total light transmittance, a Rockwell hardness, a flexural strength, a flexural elastic modulus, a linear expansion coefficient, and to photographing the dispersion state of the silica particulate by using a transmission electron microscope. The results of the measurements are shown in Table 1. The results in Table 1 exhibit that the specimen was excellent in dispersion state of silica particulate and good in transparency. This is supposed to depend upon the fact that, in the resin composition constituting the specimen, the surface of each silica particulate was covered with the polymer of polycarbonate.

It has been confirmed that the specimen was high in transparency and improved in the hardness of its surface, the flexural strength, the flexural elastic modulus, and lowered in the linear expansion coefficient, as compared with single polycarbonate resin.

EXAMPLE 10

Polypropylene oligomer was dissolved in normal hexane (solvent) adjusting the concentration of a solution of polypropylene oligomer at 14% by weight, thus preparing a resin solution. Silica particulate (produced by Nippon Aerosil Co., Ltd. and having the trade name of RX200) was added to the resin solution, in such an amount of 80% by weight relative to the solid content of the polypropylene oligomer in the resin solution. Then, the resin solution was stirred and well mixed in which defoaming agent, coupling agent and the like were suitably added to the resin solution, thereby obtaining a transparent resinous solution containing silica particulate and the resin. This resinous solution was dried so as to form a resin composition. This resin composition was mixed and kneaded with syndiotactic polypropylene upon being molten under the action of a kneader, thus obtaining a resin composition containing 40% by weight of silica particulate. This resin composition was molded upon heating into a specimen for a plastic window panel.

The thus formed specimen was subjected to measurements for a total light transmittance, a Rockwell hardness, a flexural strength, a flexural elastic modulus, a linear expansion coefficient, and to photographing the dispersion state of the silica particulate by using a transmission electron microscope. The results of the measurements are shown in Table 1. The results in Table 1 exhibit that the specimen was excellent in dispersion state of silica particulate and good in transparency. This is supposed to depend upon the fact that, in the resin composition constituting the specimen, the surface of each silica particulate was covered with the polymer of polypropylene.

It has been confirmed that the specimen was high in transparency and improved in the hardness of its surface, the flexural strength, the flexural elastic modulus, and lowered in the linear expansion coefficient, as compared with single polypropylene resin.

EXAMPLE 11

Polypropylene oligomer was dissolved in normal hexane (solvent) adjusting the concentration of a solution of polypropylene oligomer at 14% by weight, thus preparing a resin solution. Silica particulate (produced by Nippon Aerosil Co., Ltd. and having the trade mane of RX200) was added to the resin solution, in such an amount of 80% by weight relative to the solid content of the polypropylene oligomer in the resin solution. Then, the resin solution was stirred and well mixed in which defoaming agent, coupling agent and the like were suitably added to the resin solution, thereby obtaining a transparent resinous solution containing silica particulate and the resin. This resinous solution was dried so as to form a resin composition. This resin composition was mixed and kneaded with syndiotactic polypropylene upon being molten under the action of a kneader, thus obtaining a resin composition containing 40% by weight of silica particulate. This resin composition was molded upon heating into a test piece.

A hard coating layer of organic silane compound was formed on the surface of this test piece under brushing a hard coating solution or surface treatment agent (produced by Chisso corporation and having the trade name of HardSil AM). After evaporation of the solvent in the brushed solution, the brushed solution was dried at 120° C. for 30 minutes thereby obtaining a specimen for a plastic window panel.

The thus formed specimen was subjected to measurements for a total light transmittance, a Rockwell hardness, a flexural strength, a flexural elastic modulus, a linear expansion coefficient, and to photographing the dispersion state of the silica particulate by using a transmission electron microscope. The results of the measurements are shown in Table 1. The results in Table 1 exhibit that the specimen is excellent in dispersion state of silica particulate and good in transparency. This is supposed to depend upon the fact that, in the resin composition constituting the specimen, the surface of each silica particulate was covered with the polymer of polypropylene. The specimen was provided at its surface with the coating layer of organic silane compound and therefore particularly high in hardness of its surface.

It has been confirmed that the specimen was provided with a hard coating layer having a thickness ranging from 6 to 8 $\mu$m and therefore high in hardness of its surface, as compared with the specimen containing the syndiotactic polypropylene resin and silica particulate as in Example 10.

EXAMPLE 12

Benzoyl peroxide (a polymerization initiator) in an amount of 0.5 part by weight was added into 100 parts by weight of methyl methacrylate to form a mixture. This mixture was added dropwise into water in a reactor under stirring and heated at 90° C. An aqueous dispersion which had been previously prepared by dispersing silica particulate (produced by Nissan Chemical Industries, Ltd. and having the trade name of Snowtex C) having a particle size ranging from 10 to 20 nm in water was gradually added dropwise into a reaction solution in the reactor thus to accomplish an emulsion copolymerization.

Then, polyvinyl alcohol (water-soluble high polymer) was added to the reaction solution so that emulsion of silica particulate and polymethyl methacrylate was stabilized.

After about 1 hour, ethanol for solidification was added to the reaction solution so as to sediment silica particulate and acrylic resin, thus obtaining a resin composition having a ratio (in wt %) between silica particulate and acrylic resin being 40/60. This resin composition was dried and subjected to a press molding upon heating, thereby forming a specimen for a plastic window panel.

The thus formed specimen was subjected to measurements for a total light transmittance, a Rockwell hardness, a flexural strength, a flexural elastic modulus, a linear expansion coefficient and chemical (solvent) resistance, and to photographing the dispersion state of silica particulate by using a transmission electron microscope. The results of the measurements are shown in Table 2. It has been confirmed that the specimen was high in transparency and improved in the hardness of its surface, the flexural strength, the flexural elastic modulus, and lowered in the linear expansion coefficient, as compared with single acrylic resin. Additionally, the specimen was improved in chemical (solvent) resistance to aromatic hydrocarbon solvent. These are supposed to depend upon the following facts: Silica particulate used in this example was provided at its surface with hydroxide group so as to be covered with hydroxide group. Accordingly, the silica particulate was well dispersible in an aqueous solution. Besides, the specimen was fabricated by heating and molding the resin composition which was obtained by mixing silica particulate to the acrylic resin which was in its process of emulsion polymerization.

It has been confirmed that the specimen was high in transparency and improved in the hardness of its surface, the flexural strength, the flexural elastic modulus, and lowered in the linear expansion coefficient, as compared with single acrylic resin. Additionally, it has been confirmed that the specimen was improved in chemical (solvent) resistance to aromatic hydrocarbon solvents (benzene, toluene and xylene).

COMPARATIVE EXAMPLE 1

Powder-state silica particulate (having a particle size ranging from 10 to 20 nm) in an amount of 40 parts by weight was mixed and kneaded with 60 parts by weight of molten polymethyl methacrylate by using a biaxial kneading and extrusion machine, in which aggregation of silica particulate occurred, so as to form a mixture. This mixture was formed into opaque resin pellets. The resin pellets were then subjected to an injection molding thereby obtaining a specimen for a plastic window panel.

The thus obtained specimen was subjected to measurements for a total light transmittance, a Rockwell hardness, a flexural strength, a flexural elastic modulus, a linear expansion coefficient, and to photographing the dispersion state of the silica particulate by using a transmission electron microscope. The results of the measurements are shown in Table 2. It has been confirmed that the dispersion state of silica particulate was bad so that aggregation of silica particulate was found, while the transparency of the specimen was low. In the specimen produced in a production process of Comparative Example 1, dispersion of silica particulate was insufficient though silica particulate (40 parts by weight) was kneaded with polymethyl methacrylate (60 parts by weight) because the surface of each silica particulate had not been previously covered with polymethyl methacrylate resin so that aggregation of silica particulate occurred in which the aggregated silica particulate grew to have a diameter over the wavelengths of visible light. As result, the specimen was opaque.

It has been confirmed that the specimen was low in transparency and improved in the hardness of its surface, the flexural strength, the flexural elastic modulus, and lowered in the linear expansion coefficient, as compared with single acrylic resin.

COMPARATIVE EXAMPLE 2

Methyl ethyl ketone (solvent) in which silica particulate (having a particle size ranging from 380 to 400 nm which were larger than the wavelengths of visible light) had been dispersed was added dropwise to a polymethyl methacrylate solution which had been prepared by dissolving polymethyl methacrylate in methyl ethyl ketone, so as to form a mixture solution. The mixture solution was stirred and mixed with each other. Then, ethanol as a solvent for solidification was added to the mixture solution so as to sediment silica particulate and polymethyl methacrylate resin. As a result, a resin composition was obtained to have a ratio (in wt %) between silica particulate and acrylic resin being 40/60.

The thus obtained resin composition was dried and formed into a specimen for a plastic window panel by a molding under heating. The thus formed specimen was subjected to measurements for a total light transmittance, a Rockwell hardness, a flexural strength, a flexural elastic modulus, a linear expansion coefficient, and to photographing the dispersion state of silica particulate by using a transmission electron microscope. The results of the measurements are shown in Table 2. It has been confirmed that the specimen was low in transparency and improved in the hardness of its surface, the flexural strength, the flexural elastic modulus, and lowered in the linear expansion coefficient, as compared with single acrylic resin.

COMPARATIVE EXAMPLE 3

Short glass fiber in an amount of 40 parts by weight was mixed and kneaded with 60 parts by weight of molten polymethyl methacrylate to form a mixture. This mixture was formed into resin pellets which were opaque. The resin pellets were subjected to an injection molding thereby obtaining a specimen for a plastic window panel.

The thus obtained specimen was subjected to measurements for a total light transmittance, a Rockwell hardness, a flexural strength, a flexural elastic modulus, a linear expansion coefficient, and to photographing the dispersion state of silica particulate by using a transmission electron microscope. The results of the measurements are shown in Table 2. It has been confirmed that the specimen was low in transparency and improved in the hardness of its surface, the flexural strength, the flexural elastic modulus, and lowered in the linear expansion coefficient, as compared with single acrylic resin.

COMPARATIVE EXAMPLE 4

A surface hardening (treatment) agent of organic silane compound was diluted with a solvent to prepare a solution. An acrylic resin panel was dipped to be located vertical in the solution in a tank and then drawn up from the solution at a constant speed. Thereafter, the acrylic resin panel was dried upon heating so as to obtain a specimen for a plastic window panel, in which the acrylic resin panel was coated at its opposite surfaces with coating layers of organic silane compound.

The thus obtained specimen was subjected to measurements for a total light transmittance, a Rockwell hardness, a flexural strength, a flexural elastic modulus, a linear expansion coefficient, and to photographing the dispersion state of silica particulate by using a transmission electron microscope. The results of the measurements are shown in Table 2. It has been confirmed that the specimen exhibited a surface hardness (Rockwell hardness) lower than that of the specimen formed of the resin composition containing silica particulate and acrylic resin.

COMPARATIVE EXAMPLE 5

A resin composition having a ratio (in wt %) between silica particulate and polymethyl methacrylate resin being 60/40 was produced by a production process similar to that in Example 1. The resin composition was dissolved in methyl ethyl ketone thereby preparing a resinous solution. Then, an acrylic resin panel was dipped in the resinous solution in a tank, in such a manner that the acrylic panel was located vertical. The acrylic resin panel was drawn up at a constant speed thus accomplishing coating of the resinous solution under a dipping. The thus coated acrylic resin panel was dried at 40° C. under heating so as to obtain a specimen for a plastic window panel, which was coated at its opposite surfaces with coating layers.

The thus formed specimen was subjected to measurements for a total light transmittance, a Rockwell hardness, a flexural strength, a flexural elastic modulus, a linear expansion coefficient, and to photographing the dispersion state of silica particulate by using a transmission electron microscope. The results of the measurements are shown in Table 3. It has been confirmed that the specimen was improved in hardness of its surface, as compared with the acrylic resin panel treated with the surface hardening agent of organic silane compound. As a result of photographing the dispersion state of silica particulate in the specimen by using the transparent electron microscope, it was found that silica particulate was uniformly dispersed and had a concentration of 60% by weight, and that no gradation in concentration of silica particulate was found.

It has been confirmed that the specimen was high in transparency and improved in the hardness of its surface, the flexural strength, the flexural elastic modulus, and lowered in the linear expansion coefficient, as compared with single acrylic resin.

COMPARATIVE EXAMPLE 6

A resin composition having a ratio (in wt %) between silica particulate and polymethyl methacrylate resin being 40/60 was produced by a production process similar to that in Example 1. The resin composition was dissolved in methyl ethyl ketone thereby preparing a resinous solution. Then, an acrylic resin panel was dipped in the resinous solution in a tank, in such a manner that the acrylic panel was located vertical. The acrylic resin panel was drawn up at a constant speed thus accomplishing coating of the resinous solution under a dipping. The thus coated acrylic resin panel was dried at 20° C. under heating so as to obtain a specimen for a plastic window panel, which was coated at its opposite surfaces with coating layers.

The thus obtained specimen was subjected to measurements for a total light transmittance, a Rockwell hardness, a flexural strength, a flexural elastic modulus, a linear expansion coefficient, and to photographing the dispersion state of silica particulate by using a transmission electron microscope. The results of the measurements are shown in Table 3. As a result of photographing the dispersion state of silica particulate in the specimen by using the transparent electron microscope, it was found that the surface-most layers of the coating layers were low in concentration of silica particulate so as to have a concentration of 49% by weight according to the image processing. The specimen had a surface hardness (Rockwell hardness) lower than that of the other specimens in which the surface-most layers having a high silica particulate concentration.

It has been confirmed that the specimen was high in transparency and generally the same in the flexural strength, improved in the flexural elastic modulus, and lowered in the linear expansion coefficient, as compared with single acrylic resin.

COMPARATIVE EXAMPLE 7

A resin composition having a ratio (in wt %) between silica particulate and polymethyl methacrylate resin being 80/20 was produced by a production process similar to that in Example 1. The resin composition was dissolved in methyl ethyl ketone thereby preparing a resinous solution. Then, an acrylic resin panel was dipped in the resinous solution in a tank, in such a manner that the acrylic panel was located vertical. The acrylic resin panel was drawn up at a constant speed thus accomplishing coating of the resinous solution under a dipping. The thus coated acrylic resin panel was dried at 20° C. under heating so as to obtain a specimen for a plastic window panel, which was coated at its opposite surfaces with coating layers.

The thus obtained specimen was subjected to measurements for a total light transmittance, a Rockwell hardness, a flexural strength, a flexural elastic modulus, a linear expansion coefficient, and to photographing the dispersion state of silica particulate by using a transmission electron microscope. The results of the measurements are shown in Table 3. As a result of photographing the dispersion state of silica particulate in the specimen by using the transparent electron microscope, it was found that the surface-most layers of the coating layers were high in concentration of silica particulate to have a concentration of 93% by weight determined by the image processing. Accordingly, the plastic window panel according to this Comparative Example was sufficient in surface hardness but insufficient in transparency.

It has been confirmed that the specimen was low in transparency, slightly degraded in the flexural strength, improved in the flexural elastic modulus, and lowered in the linear expansion coefficient, as compared with single acrylic resin. Additionally, it has been confirmed that the specimen was higher in the surface hardness than an acrylic resin panel which was coated at it surface with an organic silane compound.

REFERENCE EXAMPLES 1, 2 and 3.

Polymethyl methacrylate resin (produced by Mitsubishi Rayon Co., Ltd. and having the trade name of Acrypet VH), polycarbonate resin (produced by GE Plastics Japan Ltd. and having the trade name of Lexan 131), and polypropylene resin (produced by Chisso Petrochemical Corporation and having the trade name of Chisso Polypropylene for Wide Use) were respectively molded to form specimens for plastic window panels of Reference Examples 1, 2 and 3.

Each of the thus obtained specimens was subjected to measurements for a total light transmittance, a Rockwell hardness, a flexural strength, a flexural elastic modulus, a linear expansion coefficient and a chemical (solvent) resistance, and to photographing the dispersion state of silica particulate by using a transmission electron microscope. The results of the measurements are shown in Table 2.

TEST METHODS FOR EVALUATION

The total light transmittance, the Rockwell hardness, the flexural strength, the flexural elastic modulus, the linear expansion coefficient and the dispersion state of silica particulate, and the silica particulate concentration in the surface-most layer, the chemical resistance and the particle size of silica particulate shown in Examples 1 to 12, Comparative Examples 1 to 7 and Reference Examples 1 to 3 were measured by the following test methods for the purpose of evaluating the performances of the plastic window panels produced by the various examples:

Total Light Transmittance was measured by using a Haze Meter HM-65 produced by Murakami Color Research Laboratory and according to ASTM D 1003.

Rockwell Hardness was measured by using a Rockwell hardness tester (M-scale) and according to ASTM D785

Flexural Strength and Flexural Elastic Modulus were measured by using an Autograph DCS-10T produced by Shimadzu Corp. and according to ASTM D790.

Linear Expansion Coefficient was measured by using a thermal expansion measuring device (TMA 120C) produced by Seiko Instruments Inc.

Dispersion State of Silica Particulate was observed in the following manner: The specimen for the plastic window panel was cut in thickness direction to expose a cut surface. The cut surface was photographed at 80000 magnifications by using a transmission electron microscope (H-800) produced by Hitachi, Ltd. Then, observation was made on a photograph of the cut surface so as to judge as to whether respective silica particulates (enlarged to have a diameter of about 1 mm) were dispersed or not.

Silica Particulate Concentration in Surface-most Layer was measured by the following manner: The specimen for the plastic window panel was cut in thickness direction to expose a cut surface. Photographing was made successively in the thickness direction from the upper surface to the lower surface of the surface-most layer, at 80000 magnifications by using at a transmission electron microscope (H-800) produced by Hitachi, Ltd. In a thus taken photograph, each silica particulate assumed a dark circle, while acrylic resin assumed blight. The photograph was subjected to an image processing so as to obtain a total area for the dark circles corresponding to silica particulate thus obtaining the concentration of silica particulate in the specimen.

Chemical (Solvent) Resistance was measured by the following manner: A drop of each of benzene, toluene and xylene was fallen onto the surface of the specimen for a plastic window panel. In this state, the specimen was allowed to stand for 24 hours at 25° C. Then, observation with the naked eye was made on the specimen as to whether changes in external appearance (such as gloss deterioration and swelling) occurred. In Table 2, "Good" indicates that the specimen made no change or deformation, while "Bad" indicates that the specimen made its change or deformation.

Particle Size of Silica Particulate was measured by photographing at a high magnifications a plurality of particles of silica particulate in the specimen at high magnifications by using the transmission electron microscope so as to indicate the particle size (diameter) as a range.

As appreciated from the above, according to an inventive aspect of the present invention, the plastic window panel containing therein silica particulate in a dispersed state is produced by one of a first method and a second method. The first method comprising mixing a first solvent in which said silica particulate having the particle size not larger than wavelengths of visible light is dispersed, and a second solvent in which transparent and noncrystalline organic high polymer is dissolved, so as to obtain a resin composition. The second method comprises mixing silica particulate having the particle size not larger than wavelengths of visible light, in an organic high polymer which is in a process of its formation, to obtain a resin composition. The thus obtained resin composition is molded under heating into the plastic window panel.

In the thus produced plastic window panel, silica particulate not larger than the wavelengths of visible light can be effectively dispersed in the transparent noncrystalline organic high polymer (transparent resin) without occurring its aggregation. As a result, the plastic window panel of this inventive aspect is improved in strength, rigidity, surface hardness and lowered in thermal expansion coefficient as compared with a panel of a single transparent resin, without lowering a light transmittance of the transparent high polymer serving as a matrix.

According to another inventive aspect of the present invention, the above-mentioned resin composition is molten in a solvent to obtain the resinous solution. The resinous solution is applied onto the surface of the transparent plastic panel and dried in a manner to control an evaporation rate of the solvent thereby to form a coating layer on the transparent panel. The thus formed coating layer has an optimum concentration gradation of silica particulate. As a result, the plastic window panel according to the inventive aspect is improved in strength, rigidity, surface hardness and lowered in thermal expansion coefficient as compared with a panel of a single transparent resin, without lowering a light transmittance of the transparent plastic panel.

Furthermore, the above-mentioned resin composition can be molded into a variety of molded products having the above characteristics under an injection molding, an extrusion molding, a blow molding and the like. It will be understood that the plastic window panel of the present invention is not required to be machined at its peripheral portion particularly in case of being molded by an injection molding thereby improving a production efficient thereof while a window panel of inorganic glass is required to be finished at its peripheral portion by machining.

The entire contents of Japanese Patent Applications P10-88419 (filed Apr. 1, 1998) and P11-51015 (filed Feb. 26, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

TABLE 1

| Diameter of silica particulate (nm) | Trade name | Manufacturer | Reference |
|---|---|---|---|
| 5–10 | Aerosil RX200 | Nippon Aerosil Co., Ltd. | Very fine particulate (powder) |
| 10–20 | Snowtex MEK-ST | Nissan chemical industries, Ltd. | —$CH_3$ group at silica particulate surface |
| 10–20 | Snowtex C | Nissan chemical industries, Ltd. | —OH group at silica particulate surface |

TABLE 2

|  | Example 1 | Example 2 | Example 3 | Example 4 | Example 9 | Example 10 | Example 11 | Example 12 |
|---|---|---|---|---|---|---|---|---|
| Production method | Batch polymerization | Solvent mixing | Solvent mixing | Kneading | Solvent mixing | Solvent mixing | Hard coating formation | Solvent mixing |
| Monomer polymerized | Methyl methacrylate | — | — | — | Methyl methacrylate | — | — | Polymethyl methacrylate |
| Polymer kneaded | — | — | — | Polymethyl methacrylate | Polycarbonate | Syndiotactic polypropylene | Syndiotactic polypropylene | — |
| Surface treatment agent | — | — | — | — | — | — | Organic silane compound | — |
| Diameter of silica particulate | 10–20 | 10–20 | 100–200 | 10–20 | 5–10 | 5–10 | 5–10 | 5–10 |
| Total light tramittance (%) | 92 | 92 | 90 | 90 | 92 | 90 | 90 | 92 |
| Dispersion state | Excellent | Excellent | Good | Good | Excellent | Excellent | Excellent | Excellent |
| Rockwell hardness (M-scale) | 115 | 115 | 115 | 115 | 97 | 100–110 | 110–120 | 115 |
| Flexural strength (MPa) | 120 | 120 | 120 | 120 | 110 | 55–60 | 55–60 | 120 |
| Flexural elastic modulus (MPa) | 3250 | 3250 | 3250 | 3250 | 3200 | 3000 | 3500 | 3250 |
| Linear expansion coefficient (1/° C.) | $4.5 \times 10^{-3}$ | $4.5 \times 10^{-3}$ | $4.5 \times 10^{-3}$ | $4.5 \times 10^{-3}$ | $4.5 \times 10^{-3}$ | $4.5 \times 10^{-3}$ | $4.5 \times 10^{-3}$ | $4.5 \times 10^{-3}$ |
| Chemical resistance, 23° C. 24 hrs |  |  |  |  |  |  |  |  |
| Benzene | — | — | — | — | — | — | — | Good |
| Toluene |  |  |  |  |  |  |  | Good |
| Xylene |  |  |  |  |  |  |  | Good |

|  | Comparative Example 1 | Comparative Example 2 | Comparative Example 3 | Reference Example 1 | Reference Example 2 | Reference Example 3 |
|---|---|---|---|---|---|---|
| Production method | Kneading | Solvent mixing | Kneading | Polymethyl methacrylate | Polycarbonate | Polypropylene |
| Monomer polymerized | — | — | — |  |  |  |
| Polymer kneaded | Polymethyl methacrylate | Polymethyl methacrylate | Polymethyl methacrylate |  |  |  |
| Surface treatment agent | — | — | — |  |  |  |
| Diameter of silica particulate | 10–20 | 380–400 | Short glass fiber | — | — | — |
| Total light tramittance (%) | 84 | 80 | 60 | 93 | 92 | 90 |
| Dispersion state | Aggregation found | Aggregation found | Aggregation found | — | — | — |
| Rockwell hardness (M-scale) | 105 | 105 | 105 | 100 | 77 | 70–80 |
| Flexural strength (MPa) | 120 | 120 | 130 | 110 | 92 | 30–45 |
| Flexural elastic modulus (MPa) | 3220 | 3220 | 3500 | 3200 | 2350 | 1200–1700 |
| Linear expansion coefficient (1/° C.) | $4.5 \times 10^{-6}$ | $4.5 \times 10^{-5}$ | $4 \times 10^{-5}$ | $6 \times 10^{-5}$ | $7 \times 10^{-5}$ | $15-20 \times 10^{-5}$ |
| Chemical resistance, 23° C. 24 hrs |  |  |  |  |  |  |
| Benzene | — | — | — | Bad | — | — |
| Toluene |  |  |  | Bad |  |  |
| Xylene |  |  |  | Bad |  |  |

TABLE 3

|  | Example 5 | Example 6 | Example 7 | Example 8 |
|---|---|---|---|---|
| Production method | Dipping | Casting | Flow coating | Spin coating |
| Surface treatment agent | — | — | — | — |
| Total light transmittance (%) | 91 | 91 | 91 | 91 |
| Silica particulate diameter (nm) | 10–20 | 10–20 | 10–20 | 10–20 |
| Dispersion state | Surface-most layer-high conc. Conc. gradation found | Surface-most layer-high conc. Conc. gradation found | Surface-most layer-high conc. Conc. gradation found | Surface-most layer-high conc. Conc. gradation found |
| Silica conc. at surface-most layer (wt %) | 70–80 | 70–80 | 70–80 | 70–80 |
| Rockwell hardness (M-scale) | 120 | 120 | 120 | 120 |
| Flexural strength (MPa) | 125 | 125 | 125 | 125 |
| Flexural elastic modulus (MPa) | 3300 | 3300 | 3300 | 3300 |
| Linear expansion coefficient (1/° C.) | $5 \times 10^{-5}$ | $5 \times 10^{-5}$ | $5 \times 10^{-5}$ | $5 \times 10^{-5}$ |

|  | Comparative Example 4 | Comparative Example 5 | Comparative Example 6 | Comparative Example 7 |
|---|---|---|---|---|
| Production method | Dipping | Dipping | Dipping | Dipping |
| Surface treatment agent | Organic silane compound | — | — | — |
| Total light transmittance (%) | 92 | 90 | 90 | 85 |
| Silica particulate diameter (nm) | No silica particulate | 10–20 | 10–20 | 10–20 |
| Dispersion state | — | Conc. gradation not found | Surface-most layer-low conc. Conc. gradation found | Surface-most layer-high conc. Conc. gradation found |
| Silica conc. at surface-most layer (wt %) | — | 60 | 49 | 93 |
| Rockwell hardness (M-scale) | 110 | 105 | 103 | 120 |
| Flexural strength (MPa) | 110 | 115 | 110 | 100 |
| Flexural elastic modulus (MPa) | 3200 | 3220 | 3210 | 3300 |
| Linear expansion coefficient (1/° C.) | $6 \times 10^{-5}$ | $5 \times 10^{-5}$ | $4.6 \times 10^{-5}$ | $4.4 \times 10^{-5}$ |

What is claimed is:

1. A process for producing a plastic window panel comprising:
   providing silica particulate having a particle size not larger than wavelengths of visible light;
   mixing said silica particulate into a transparent non-crystalline organic polymer selected from the group consisting of oligomer and polymer of at least one selected from the group consisting of acrylic resin, polycarbonate resin, styrene-containing resin and polyolefin resin, during polymerization of said organic polymer, to obtain a resin composition;
   molding said resin composition under heating to form at least a part of said plastic window panel; and
   forming a hard coating layer on at least one surface of said plastic panel, said hard coating layer being made of an organic silane compound.

2. A process for producing a plastic window panel, said process comprising:
   providing silica particulate having a particle size not larger than a wavelength of visible light;
   mixing said silica particulate into a transparent non-crystalline organic polymer and heating, during formation of said organic polymer in the presence of a polymerization initiator which participates only in promoting polymerization of said organic polymer upon the heating, to obtain a resin composition, wherein a composition during polymerization of the organic polymer consists essentially of the silica particulate, a monomer or oligomer of the organic polymer and the polymerization initiator, said transparent non-crystalline organic polymer comprising oligomer or polymer of acrylic resin; and
   molding said resin composition under heating.

3. A process as claimed in claim 2, wherein said molding is accomplished by one selected from the group consisting of extrusion molding, injection molding, and blow molding.

4. A process as claimed in claim 2, wherein the particle size of said silica particulate is within a range of from 5 nm to 20 nm.

5. A process as claimed in claim 2, wherein the particle size of said silica particulate is within a range of from 5 to 10 nm.

6. A process for producing a plastic window panel including a plastic panel of a transparent non-crystalline organic polymer, and a surface layer formed on a surface of said plastic panel and formed of a transparent non-crystalline organic polymer and containing silica particulate having a particle size not larger than wavelengths of visible light, said surface layer having a gradation in a silica particulate concentration in which the concentration of said silica particulate gradually lowers toward a center in thickness of said plastic window panel, said surface layer including a surface-most layer having a silica particulate concentration ranging from 50 to 92% by weight, said transparent noncrystalline organic polymer being at least one selected from the group consisting of oligomer and polymer of acrylic resin, said process comprising:

providing said silica particulate having the particle size not larger than a wavelength of visible light;

mixing said silica particulate into said organic polymer, during formation of said organic polymer and polymerizing said organic polymer by heating, to obtain a resin composition;

dissolving said resin composition in a solvent to form a resinous solution;

applying said resinous solution onto said transparent plastic panel; and drying said resinous solution on said transparent plastic panel at a temperature ranging from 18 to 25° C. and at a drying rate ranging from 16 to 32 kg/m²·hr, so as to form said surface layer.

7. A process as claimed in claim 6, wherein said applying said resinous solution is accomplished by dipping.

8. A process as claimed in claim 6, wherein said applying said resinous solution is accomplished by flow coating.

9. A process as claimed in claim 6, wherein said applying said resinous solution is accomplished by casting.

10. A process as claimed in claim 6, wherein said applying said resinous solution is accomplished by spin coating.

11. A process for producing a plastic window panel comprising:

providing silica particulate having a particle size not larger than a wavelength of visible light;

mixing said silica particulate into a transparent non-crystalline organic polymer during formation of said organic polymer, to obtain a resin composition, wherein a composition during the formation of the organic polymer consists essentially of the silica particulate, a monomer or oligomer of the organic polymer and a polymerization initiator; and molding said resin composition under heating;

wherein said transparent non-crystalline organic polymer is selected from the group consisting of oligomer and polymer of at least one selected from the group consisting of acrylic resin, polycarbonate resin, styrene-containing resin and a polyolefin resin.

12. A process for producing a plastic window panel comprising:

providing silica particulate having a particle size not larger than a wavelength of visible light;

mixing said silica particulate into a transparent non-crystalline organic polymer during formation of said organic polymer, to obtain a resin composition; and molding said resin composition under heating to form at least a portion of said plastic window panel;

wherein said transparent non-crystalline organic polymer resin comprises syndiotactic polypropylene or a polypropylene resin mixed with syndiotactic polypropylene.

13. A process for producing a plastic window panel as set forth in claim 12, wherein at least the transparent non-crystalline organic polymer resin comprises syndiotactic polypropylene synthesized in the presence of a metallocene catalyst.

14. A process for producing a plastic window panel as set forth in claim 12, wherein at least the transparent non-crystalline organic polymer resin comprises a polypropylene resin mixed with syndiotactic polypropylene.

15. A process for producing a plastic window panel, said process comprising:

providing silica particulate having a particle size not larger than a wavelength of visible light;

polymerizing a transparent non-crystalline organic polymer using a polymerization initiator which participates only in the polymerization of said organic polymer when heated, to obtain an acrylic resin composition;

mixing said silica particulate into said transparent non-crystalline organic polymer during the polymerization of said organic polymer; and molding said resin composition under heating.

* * * * *